United States Patent
Zhao et al.

(10) Patent No.: US 11,681,737 B2
(45) Date of Patent: Jun. 20, 2023

(54) ELECTRONIC MEDIA RETRIEVAL

(71) Applicant: ADOBE INC., San Jose, CA (US)

(72) Inventors: Handong Zhao, San Jose, CA (US); Ajinkya Kale, San Jose, CA (US); Xiaowei Jia, Minneapolis, MN (US); Zhe Lin, Fremont, CA (US)

(73) Assignee: ADOBE INC., San Jose, CA (US)

( * ) Notice: Subject to any disclaimer, the term of this patent is extended or adjusted under 35 U.S.C. 154(b) by 181 days.

(21) Appl. No.: 16/843,218

(22) Filed: Apr. 8, 2020

(65) Prior Publication Data

US 2021/0319056 A1    Oct. 14, 2021

(51) Int. Cl.
  *G06F 16/43*    (2019.01)
  *G06F 16/45*    (2019.01)
  *G06F 16/438*   (2019.01)
  *G06N 3/04*     (2023.01)
  *G06N 3/08*     (2023.01)

(52) U.S. Cl.
  CPC ............ *G06F 16/43* (2019.01); *G06F 16/438* (2019.01); *G06F 16/45* (2019.01); *G06N 3/04* (2013.01); *G06N 3/08* (2013.01)

(58) Field of Classification Search
  CPC ......... G06F 16/438; G06F 16/43; G06F 16/45
  USPC ...................................................... 707/737
  See application file for complete search history.

(56) References Cited

U.S. PATENT DOCUMENTS

2018/0032518 A1\* 2/2018 Kordasiewicz ....... G06F 16/338
2019/0286752 A1   9/2019 Leskovec et al.

FOREIGN PATENT DOCUMENTS

CN    1106744407    1/2020

OTHER PUBLICATIONS

Search and Examination report dated Jun. 9, 2021 which was issued by the UK Intellectual Property Office in the corresponding UK Appln. No. GB2100958.4.
Examination report dated Feb. 9, 2023 which was issued by the UK Intellectual Property Office in the corresponding UK Appln. No. GB2100958.4.
Examination report dated Oct. 19, 2022 which was issued by the UK Intellectual Property Office in the corresponding UK Appln. No. GB2100958.4.

(Continued)

*Primary Examiner* — Hosain T Alam
*Assistant Examiner* — Tracy M McGhee
(74) *Attorney, Agent, or Firm* — F. Chau & Associates, LLC (57) ABSTRACT

The present disclosure relates to a retrieval method including: generating a graph representing a set of users, items, and queries; generating clusters from the media items; generating embeddings for each cluster from embeddings of the items within the corresponding cluster; generating augmented query embeddings for each cluster from the embedding of the corresponding cluster and query embeddings of the queries; inputting the cluster embeddings and the augmented query embeddings to a layer of a graph convolutional network (GCN) to determine user embeddings of the users; inputting the embedding of the given user and a query embedding of the given query to a layer of the GCN to determine a user-specific query embedding; generating a score for each of the items based on the item embeddings and the user-specific query embedding; and presenting the items having the score exceeding a threshold.

20 Claims, 6 Drawing Sheets

(56) References Cited

OTHER PUBLICATIONS

Jones, Karen Sparck, "A Statistical Interpretation of Term Specificity and Its Application in Retrieval", Journal of Documentation, vol. 60, No. 5, 2004, pp. 493-502.
Kingma, et al., "Adam: a Method for Stochastic Optimization", Published as a conference paper at ICLR 2015.
Mikolov, et al., "Advances in Pre-Training Distributed Word Representations", arXIV:1712.09405v1 [cs.CL] Dec. 26, 2017.
Kanungo, et al., "An Efficient k-Means Clustering Algorithm: Analysis and Implementation", IEEE Transactions on Pattern Analysis and Machine Intelligence, vol. 24, No. 7, Jul. 2002.
He et al., "Deep Residual Learning for Image Recognition"; arXiv:1512.03385v1 [cs.CV] Dec. 10, 2015.
Juan et al., "Graph-Rise: Graph-Regularized Image Semantic Embedding", ACM ISBN 978-1-4503-9999-9/18/06, Feb. 2019.
Hamilton et al., "Inductive Representation Learning on Large Graphs", 31st Conference on Neural Information Processing Systems (NIPS 2017), Long Beach, CA, USA.
Aggarwal et al., "Multitask Test-To-Visual Embedding With Titles and Clickthrough Data", arXiv:1905.13339v1 [cs.CV] May 30, 2019.
Examination report dated Jun. 22, 2022 which was issued by the UK Intellectual Property Office in the corresponding UK Appln. No. GB2100958.4.

\* cited by examiner

ELECTRONIC MEDIA RETRIEVAL

TECHNICAL FIELD

This disclosure relates to techniques for retrieving electronic media, and more particularly, to techniques for retrieving electronic media using a graph convolutional neural network (GCN).

BACKGROUND

Content retrieval systems enable users to enter one or more keywords to retrieve desired electronic media such as an image, a movie, a computer program, a song, and the like. For example, the content retrieval system might include a text field to enable the user to enter the keyword(s) and a pane that displays the media that best matches the entered keyword(s).

Personalized content retrieval systems consider past user behavior when performing a search for related electronic media. For example, if a user frequently clicked on a landscape image, the user would be more likely to view similar landscape images in future queries.

However, traditional personalized content retrieval systems are limited in their ability to fully capture user preferences for a number of reasons including: the feature extraction methods used to extract user preferences fail to learn complex non-linear relationships from item features and the similarity amongst users; and methods mostly focused on extracting user embeddings without exploring ways to enhance item features.

SUMMARY

Embodiments of the present disclosure provide techniques for retrieving electronic media (e.g., images, movies, computer programs, songs, etc.) from user and item embeddings learned by leveraging user behavior data in a Graph Convolutional Neural Network (GCN) model. For example, at least one of the exemplary embodiments provides a new framework referred to herein as a Cluster-Augmented Graph Convolutional Network (CA-GCN) that utilizes user-item interaction data to enhance both user and item embeddings in a GCN and also leverages item-item similarities in a clustering structure to augment sparse user behavior data.

According to an exemplary embodiment of the disclosure, a computer-implemented method for retrieving at least one media item from a set of media items in response to a given query from a given user of a set of users includes: generating a graph including first vertices representing the set of users, second vertices representing the set of media items, the first vertices connected to the second vertices via edges, each second vertex associated with one or more item embeddings of the media items and each edge associated with query embeddings of a query; performing a clustering on the set of media items to generate a plurality of clusters; generating cluster embeddings for each cluster from the item embeddings of the media items within the corresponding cluster; generating augmented query embeddings for each cluster from the cluster embedding of the corresponding cluster and the query embeddings of the edges that pass through the corresponding cluster; inputting the cluster embeddings and the augmented query embeddings to a first layer of a graph convolutional network (GCN) to determine user embeddings of the users; inputting the user embedding of the given user and a query embedding of the given query to a second layer of the GCN to determine a user-specific query embedding; generating an item confidence score for each of the media items based on the item embeddings and the user-specific query embedding; and presenting the media items having the item confidence score exceeding an item threshold.

According to an exemplary embodiment of the disclosure, a system for retrieving at least one media item from a set of media items in response to a given query from a given user of a set of users includes: a client device including a graphical user interface configured to enable the given user to enter the given query and a computer program configured to output a request including a user identifier (ID) of the given user and the given query over a computer network; and a server configured to generate a graph from the set of users, the set of media items, and queries issued by the set of users for the set of media items, generate clusters from the set of media items, augment the graph to include the clusters, generate embeddings from the augmented graph, train a graph convolutional neural network (GCN) using the embeddings, apply the user ID and the given query to the GCN to generate a score for each of the media items, and output the media items to the client device having the score exceeding a threshold.

According to an exemplary embodiment of the disclosure, a computer-implemented method for retrieving at least one media item from a set of media items in response to a given query from a given user of a set of users includes: generating a graph including first vertices representing the set of users, second vertices representing the set of media items, the first vertices connected to the second vertices via edges, each second vertex associated with one or more item embeddings of the media items and each edge associated with query embeddings of a query; performing a clustering on the set of media items to generate a plurality of clusters; generating cluster embeddings for each cluster from the item embeddings of the media items within the corresponding cluster; generating augmented query embeddings for each cluster from the cluster embedding of the corresponding cluster and the query embeddings of the edges that pass through the corresponding cluster; inputting the cluster embeddings and the augmented query embeddings to a layer of a graph convolutional network (GCN) to determine user embeddings of the users; generating an item confidence score for each of the media items based on the item embeddings and the user embeddings; and presenting the media items having the item confidence score exceeding an item threshold.

BRIEF DESCRIPTION OF THE DRAWINGS

The detailed description describes embodiments with additional specificity and detail through use of the accompanying drawings, briefly described below.

DETAILED DESCRIPTION OF THE EXEMPLARY EMBODIMENTS

Given the amount of content available in digital form, users are unlikely to know about the entirety of this content. Consequently, search services and content repositories provide tools that allow users to search for content items having desired objects and/or visual characteristics. Conventional techniques for searching content find target items based on their matching with a given text query. Most of these methods aim to embed items and queries to the same space to facilitate matching between items and queries, but lead to sub-optimal performance since they ignore the personalized information. Conventional recommendation systems provide personalized results based on user history data, but are incapable of operating on user entered queries. Accordingly, such systems provide less relevant results. Other conventional recommendation systems make use of collaborative filtering. However due to data sparsity, such techniques may result in unreliable similarity information and poor recommendation quality.

Some conventional techniques learn enhanced embeddings for recommendation by using a graph convolutional network (GCN). However, these graph-based models suffer from sparse user-item interaction data and cannot learn representative embeddings from a limited number of nodes.

To overcome these problems, personalized retrieval in embodiments of the disclosure take a textual query of the user as input and returns the most relevant and personalized results for this user. A GCN models users and items in a bipartite graph, propagates click information in a neural network, and captures the non-linear interactions. The similarities amongst items are further leveraged to augment the graph representation. The item similarities are incorporated by grouping similar items into clusters and then the clusters are represented as hidden super-nodes in the graph to address the sparsity issue of user behavior data. In the augmented graph, the information is propagated between users and item clusters to generate representative user embeddings and also the information may be propagated between item clusters and individual items to refine media item embeddings. This technique significantly improves retrieval performance and can be used to generate enhanced media item (e.g., image) embeddings that better reflect high-level semantics (e.g., emotion) and user preferences.

For example, according to an embodiment of the disclosure, in prior history User-1 clicked a number of "alphabet"-related clip-art-styled images and User-2 clicked monochromatic color images, the embodiment returns with recommendation on searched objects, but in clip-art-styled images for user-1 and more monochromatic searched objects for User-2. According to at least one embodiment of the disclosure, a 38% improvement in terms of recall at the top 10% of images in an image retrieval task is achieved.

Embodiments of the disclosure dynamically enhance the item embeddings by propagating click information between users and items to provide results that better capture high-level semantic concepts. On the contrary, conventional recommendation systems rely on fixed item embeddings, and are only capable of providing results that are visually similar to a query image, and sometimes even provide results semantically opposite to the query image.

The following terms are used throughout the present disclosure:

The term "Graph Convolutional Network" or "GCN" may refer to a neural network that operates on a graph G—(V, E), where V are nodes or vertices of the Graph G, and E are edges of the graph G that connect the nodes together. The GCN takes as an input feature matrix $N \times F^0$ feature matrix X, where N is the number of nodes and $F^0$ is the number of input feature dimension for each node, and an $N \times N$ matrix representation of the graph structure such as the adjacency matrix A of G. A hidden layer in the GCN can thus be written in as $H^i = f(H^{i-1}, A)$, where $H^0 = X$ and f is a propagation function.

The term "media item" may refer to electronic media such as electronic image (e.g., having formats such as JPEG, TIFF, GIF, BMP, PNG, etc.), an electronic movie (e.g., having formats such as AVI, WMV, MOV, MP4, FLV, etc.), and electronic song (e.g., having formats such as WAV, AIFF, AU, MPEG, etc.), computer software, etc.

The term "media item embedding" may refer to one or more textual keywords that are associated with a media item such as an image, a movie, a song, computer program, or song.

The term "user-item interaction data" may refer to a set of (i j, l) tuples, where each tuple means that for each user j, the user j searches for a specific query l and then clicks on or purchases media items i from the retrieved results The term "Cluster-Augmented Graph Convolutional Network" or "CA-GCN" may refer to a graph convolution neural network (GCN) generated from the user-item interaction data, but further augmented with clusters generated from the media items of the GCN. The users, media items, and clusters are all nodes in the CA-GCN and the queries are edges in the CA-CGN. If a user previously clicked on a media item displayed as a result of entering a query, the node representing the user is connected via an edge representing the query to a node representing a cluster including the media item and other related media items determining according to a clustering previously performed on the media items.

The term "user embedding" may refer to one or more textual keywords that are associated with a particular user, which may include textual keywords associated with media items the user has an interest in or is predicted to have an interest in.

The term "cluster embedding" may refer to one or more textual keywords that are associated with a group of related media items.

The term "query embedding" may refer to one more textual keywords within a query of a user that relates to a media item.

The term "Rectified Linear Unit" or "ReLU" refers to an activation function of a neural network defined as the positive part of its argument: $f(x) = x^+ = \max(o, x)$, where x is the input to a neuron of the neural network.

The term "k-means clustering refers to an unsupervised machine learning algorithm that groups similar data points together and discovers underlying patterns. The algorithm looks for a fixed number (k) of clusters in a dataset, where each cluster is a collection of data points aggregated together because of certain similarities. The algorithm identifies k number of centroids (e.g., representing centers of the clusters), and then allocates every data point to the nearest cluster, while keeping the centroids as small as possible. The 'means' in the K-means refers to averaging of the data (i.e., finding the centroid).

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Figure 1:
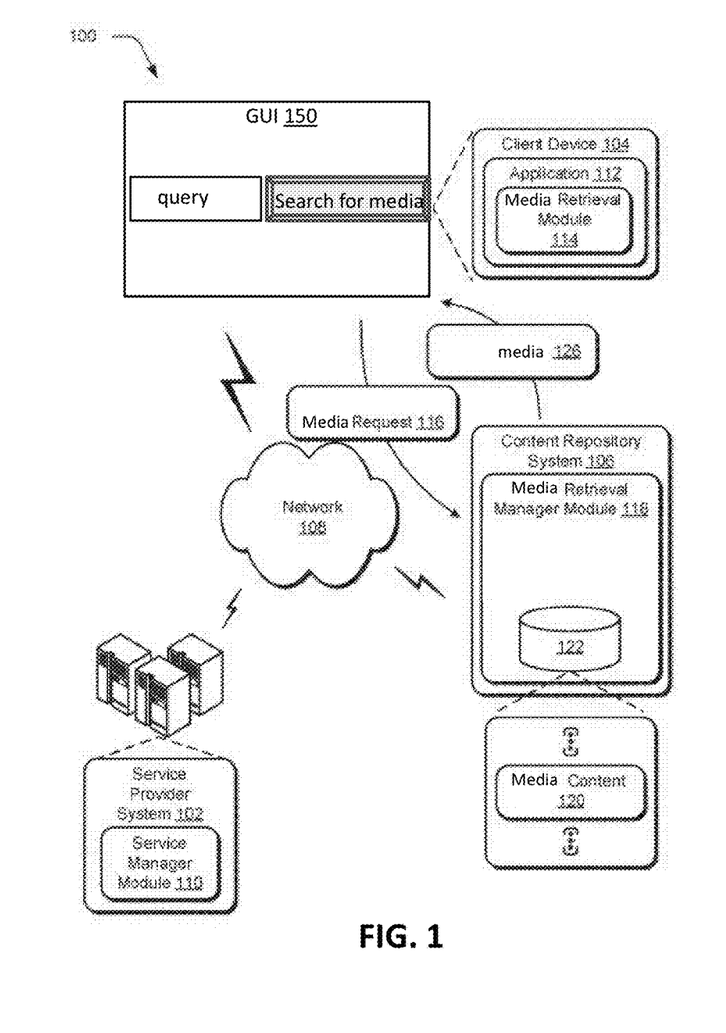
FIG. 1 is an illustration of an environment in an example implementation that is operable to employ techniques described herein.

FIG. 1 is an illustration of an environment 100 in an example implementation that is operable media (e.g., image, computer program, movie, song, etc.) retrieval as described herein. The illustrated environment 100 includes a service provider system 102, a client device 104, and a content repository system 106 that are communicatively coupled, one to another, via a network 108.

Computing devices that are usable to implement the service provider system 102, the client device 104, and the content repository system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 6.

The service provider system 102 is illustrated as including a service manager module 110 that is representative of functionality to provide services accessible via the network 108 that are usable to make products or services available to consumers. The service manager module 110, for instance, may expose content or functionality that is accessible via the network 108 by an application 112 of the client device 104. The application 112 may be configured as a browser, a network-enabled application, and so on, that obtains data from the service provider system 102 via the network 108. This data can be employed by the application 112 to enable a user of the client device 104 to communicate with the service provider system 102, such as to submit a media (e.g., image, computer program, movie, song, etc.) search query when the service provider system 102 provides functionality to perform media searches.

The application 112 includes a media retrieval module 106 to enable a user to perform a media search. For example, the user may enter a textual query into a graphical user interface (GUI) 150 presented by the image media retrieval module 114 so that the media retrieval module 114 can send a media request 116 to request that the media retrieval manager module 116 perform the media search using the entered query.

In the illustrated example, the content repository system 106 (e.g., a host server) is depicted receiving the media request 116. The media request 116 may include the entered query and a user identifier (ID) that uniquely identifies the user that entered the query. To search for media related to the query, the service provider system 102 may leverage the content repository system 106. Although functionality of the content repository system 106 is illustrated as separate from the service provider system 102, this functionality may also be incorporated as part of the service provider system 102, further divided among other entities, and so forth. The content repository system 106 includes a media retrieval manager module 118 that is implemented at least partially in hardware of a computing device, in part, to perform searches of media content 120, which is illustrated in storage 122. The media content 120 may represent digital content configured as a variety of different media maintained by the content repository system 106. For example, the media can include images, movies, computer programs, or songs uploaded to the content repository system 106 for sharing, those indexed by the content repository system 106 in connection with crawling the web, and so forth.

To search the media content 120, the media retrieval manager module 118 is configured to apply the entered query and a user ID of the user to a cluster-augmented graph convolutional network (CA-GCN) framework that can return scores for each of a plurality of media items. Media 126 including the media items having scores exceeding a certain item threshold can be output to the client device 104 for presentation on the graphical user interface 150.

Figure 2:
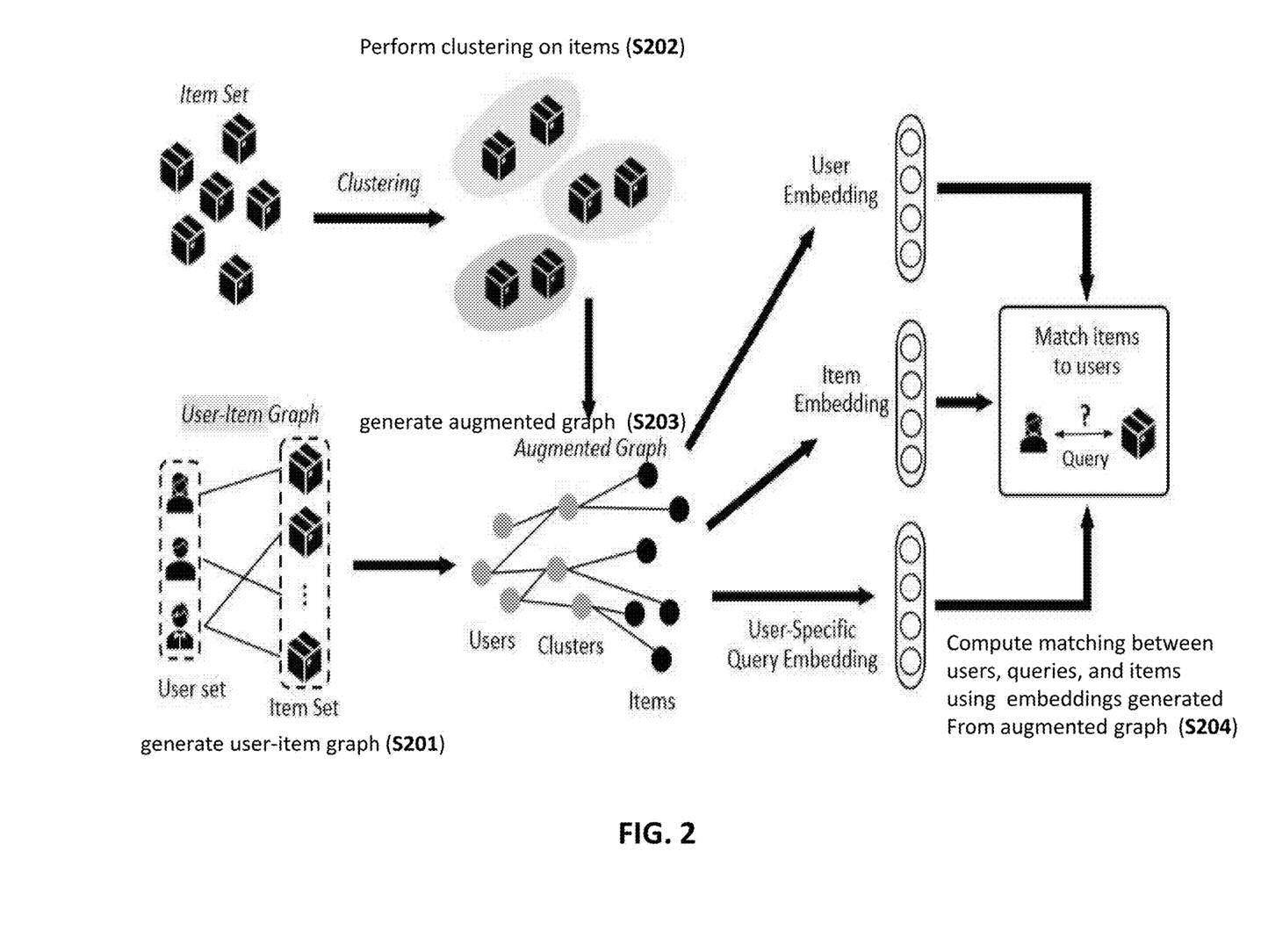
FIG. 2 illustrates a flow of the CA-GCN framework according to an exemplary embodiment of the disclosure.

FIG. 2 illustrates a method of creating the CA-GCN framework according to an exemplary embodiment of the disclosure. The CA-GCN framework is derived from a CA-GCN that is generated from existing user-item interaction data. The user-item interaction data is derived from a set of users $\mathcal{U}$ and media items $\mathcal{I}$, and associated queries. The user-item interaction data is a set of (i j, l) tuples. Each tuple means that for each user j, the user j searches for a specific query l and then clicks on or purchases media items i from the retrieved results. The media items $\mathcal{I}$ includes item features X={$x_1$, ..., $x_{Nitem}$} and the queries include query features Q={$q_1$, ..., $q_{Nquery}$}, where Nitem and Nquery are the number of media items and queries, respectively. In an exemplary embodiment, the item features of a media item such as an image are image embeddings extracted from the image pixel values. In an exemplary embodiment, the query features Q of a query are one or more textual keywords in query for a matching item. For example, if a user is searching for images of Ireland, the keywords of the corresponding query could include "Irish", "landscape", etc. In particular, $x_i$ represents the embedding for the media item i and $q_l$ is the embedding for the query l.

To incorporate the interactions between users $\mathcal{U}$ and media items $\mathcal{I}$, a bipartite user-item graph G={$\mathcal{U}$, $\mathcal{I}$, $\mathcal{E}$} is constructed (step 201). Each item i has an initial input feature. The set $\mathcal{E}$ contains edges that connect users $\mathcal{U}$ and items $\mathcal{I}$ through specific queries l and is derived from the user-item interaction data. Each edge is an (i j, l) tuple where the item i is clicked/purchased by the user j under the query l.

Next a clustering is performed on the media items $\mathcal{I}$ to address the sparsity in the user-item data (step 202). In an exemplary embodiment, k-means clustering is performed to generate the clustering. In k-means clustering, each media item is assigned to the closest cluster center, and the cluster center is jointly updated until convergence. FIG. 2 shows an example where k-means clustering was performed to generate three clusters. Please note that three clusters are shown merely for ease of illustration as the items may be grouped in various numbers of clusters well exceeding three. The clustering is performed to add more potential connections between users and item since users are likely to be interested in other items that are similar to what they clicked or purchased.

Next an augmented graph is generated from the user-item graph and the clusters (step 203). Hidden super-vertices are created that represent each of the clusters, which bridge users to items. For example, each edge that originally connected a user to an item in the user-item graph is replaced with a first edge that connects the user to a cluster of the item, and a second edge that connects the cluster to the item. Thus, the users are not directly connected to an item in the augmented graph, but to a cluster that includes the item. The augmented graph allows consideration of unclicked items. For example, if the user only clicked item 1, but item 2 is so similar that it is included in the same cluster as item 1, the framework essentially treats item 2 as if it had been clicked by the user. The set of edges between users and clusters k in the augmented graph are represented as $\tilde{\varepsilon}$, which contains a set of (j, k) pairs between users and clusters k. Once the augmented graph has been constructed, a matching between users, queries, and items is computed using embeddings generated from the augmented graph (step 204). For example, the generated embeddings may include user embeddings, media item embeddings, and query embeddings (or user-specific query embeddings).

Figure 3:
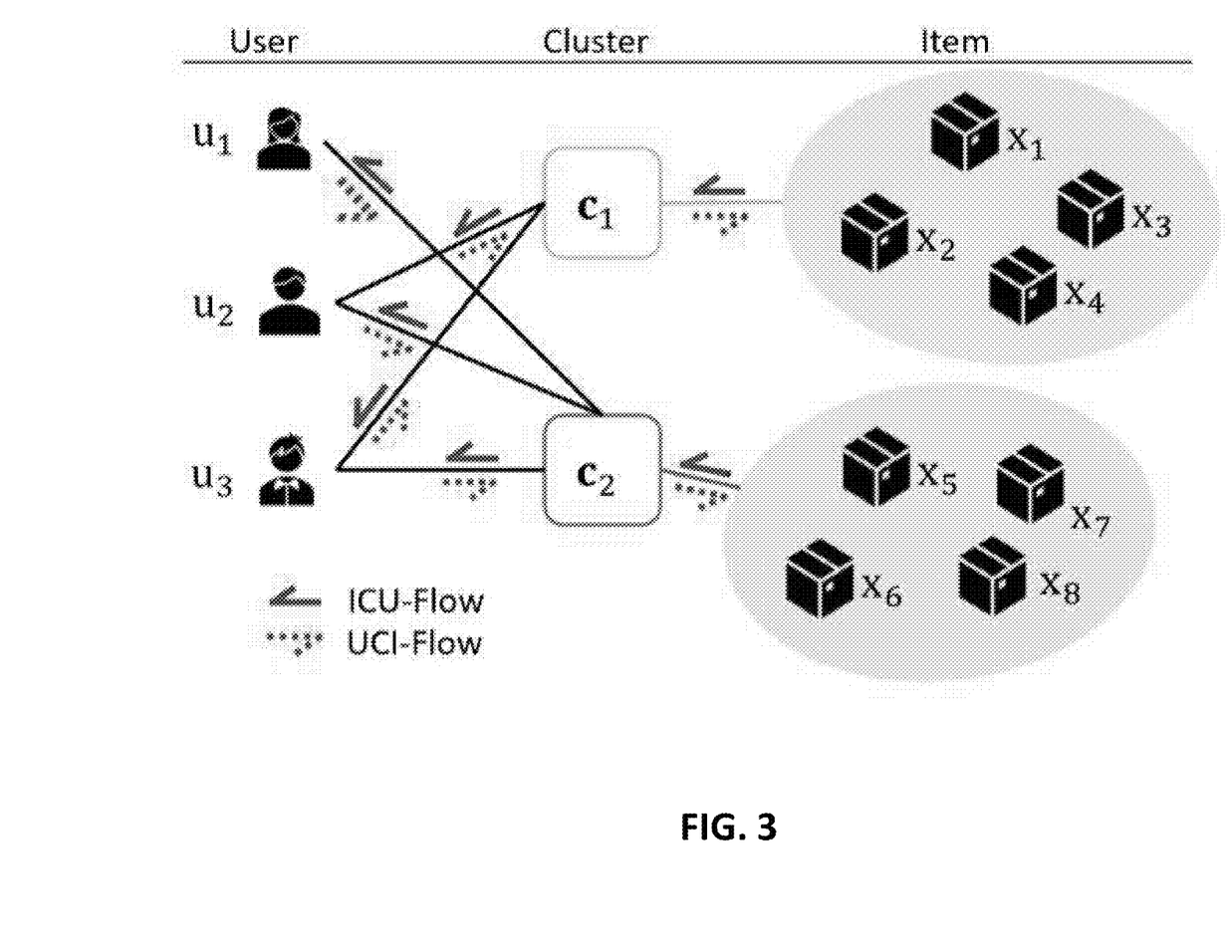
FIG. 3 illustrates an exemplary augmented graph generated as a result of clustering.

FIG. 3 illustrates exemplary items clusters in a media item (e.g., image) retrieval task. In this example, items $x_1$, $x_2$, $x_3$, and $x_4$ were grouped into a first cluster $C_1$ and items $x_5$, $x_6$, $x_7$, and $x_8$ were grouped into a second cluster, where user $u_1$ is connected to the second cluster $C_1$ since user $u_1$ previously clicked one or more of the items in the second cluster $C_2$, user $u_2$ is connected to the first cluster $C_1$ and the second cluster $C_2$ since user $u_2$ previously clicked one or more of the items in the first cluster $C_1$ and one or more items in the second cluster $C_2$, and user $u_3$ is connected to the first cluster $C_1$ and the second third cluster $C_2$ since user $u_3$ previously clicked one or more of the items in the first cluster $C_1$ and one or more items in the second cluster $C_2$.

Figure 4:
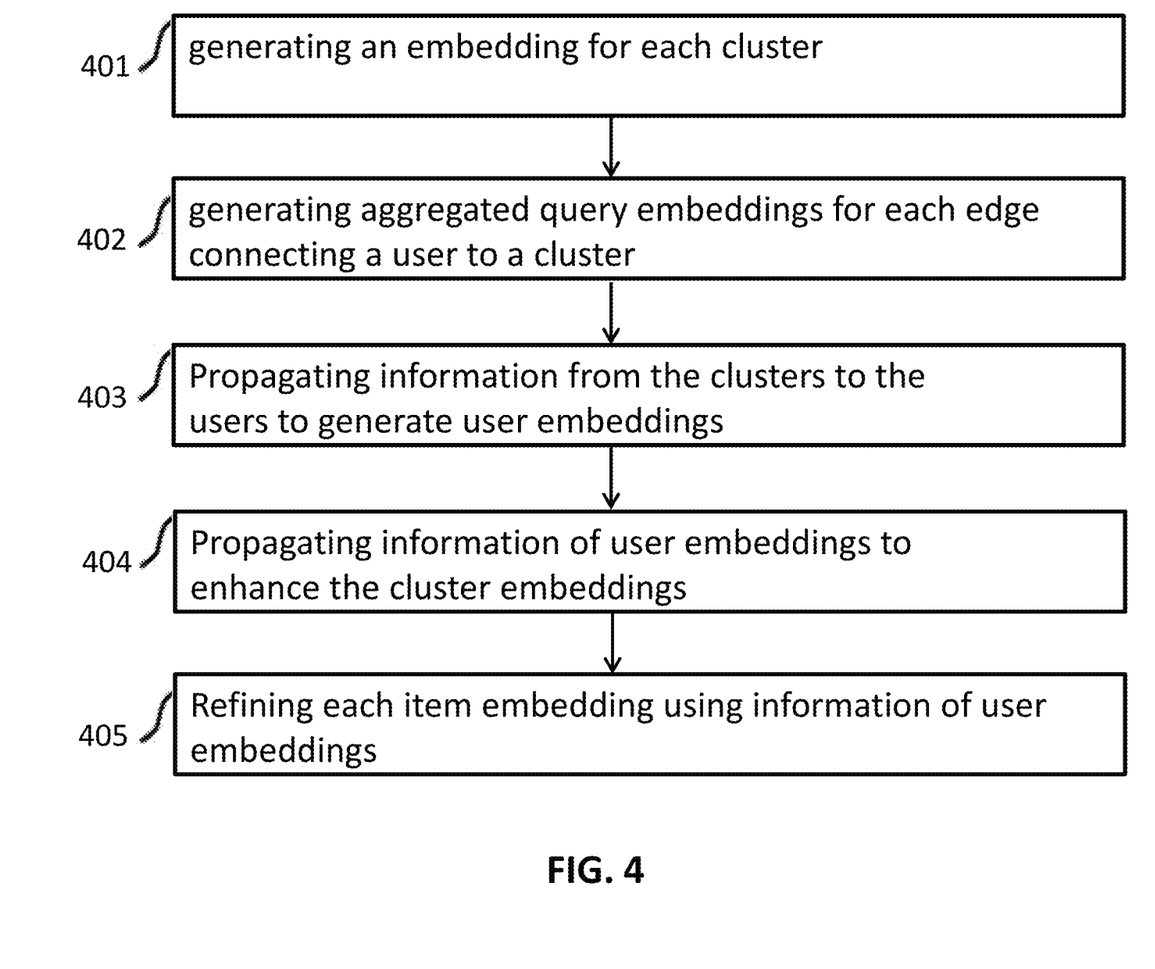
FIG. 4 illustrates a method of generating additional embeddings for a user-item graph according to an exemplary embodiment of the disclosure.

FIG. 4 illustrates a method according to an exemplary embodiment of the disclosure that can be applied to portions of the augmented graph to update embeddings of the items, create embedding of the clusters, and to create embeddings of the users. In the method, as shown in FIG. 3, information is first propagated in the order of item→cluster→user (ICU-Flow), and then propagated in the opposite order of user→cluster→item (UCI-Flow). The method includes generating an embedding for each cluster k (corresponding to a hidden super-node in the augmented graph) by summarizing the embeddings of items of the cluster (step 401). The embedding of a cluster k may be represented by $C_k$. The cluster embedding $C_k$ can be computed according to Equation 1 as follows:

$$c_k = \sum_{i \in C_k} x_i / |C_k|, \tag{1}$$

where $|C_k|$ represents the size of the cluster k.

The method next includes generating aggregated query embeddings for each connected (j,k) pair (step 402). For example, a (j,k) pair is connected if it is an edge in $\tilde{\varepsilon}$. The aggregated query embeddings are an aggregated representation of which types of queries are searched for by the user j and finally lead to clicks/purchases of items in the cluster k. The aggregated query embeddings may be $\tilde{q}_{j,k}$ be created using information of all the relevant queries, which is equivalent to summarizing queries over all the users i from the tuples (i, j, l) in the original edge set $\varepsilon$ such that i belongs to the cluster k according to Equation 2, as follows:

$$\tilde{q}_{j,k} = \mu^3_{(i,j,l) \in \varepsilon \& i \in C_k} q_l. \tag{2}$$

After gathering information from items to cluster, the method propagates information from clusters to users to generate user embeddings for each user j (step 403). The user embeddings $u_j$ for each user j may be generated according to Equation 3, as follows:

$$u_j = ReLU\left(W_u \sum_{(j,k) \in \tilde{\varepsilon}} S_{j,k} P_u[c_k, \tilde{q}_{j,k}] + b_u\right) \tag{3}$$

where $S_{j,k}$ is a normalized click/purchase count from user j to cluster k. The normalized click/purchase count $S_{j,k}$ may be generated according to Equation 4, as follows:

$$S_{j,k} = n_{j,k} / \Sigma_k n_{j,k}, \tag{4}$$

where $n_{j,k}$ is the number of items clicked/purchased from user j to cluster k. In Equation 3, a user embedding of a user is generated by aggregating the information from clicked clusters via a ReLU function, and $P_u$, $W_u$, and $b_u$ are model parameters.

Steps 401-403 represent the ICU-Flow.

Next, the method of FIG. 4 includes propagating the user information back to enhance the cluster embeddings (step 404). The enhanced cluster embeddings may be generated according to Equation 5, as follows:

$$c_k \leftarrow ReLU(W_c(c_k + \mu_{(j,k) \in \tilde{\varepsilon}} P_c u_j) + b_c), \tag{5}$$

where $W_c$, $P_c$, and $b_c$ are model parameters.

Next, the method of FIG. 4 includes refining the embedding of each item using information of user embeddings (step 405). Considering media i (e.g., an image) which belongs to cluster Cl(i), its item embedding may be refined using Equation 6, as follows:

$$x_i \leftarrow ReLU(W_c(x_i + \mu_{(j,Cl(i)) \in \tilde{\varepsilon}} P_c u_j) + b_c). \tag{6}$$

When an existing user represented by the augmented graph enters a query, the framework can apply a composite loss function to ensure that the query matches both the retrieved media item (e.g., an image) and the clusters.

In an exemplary embodiment of the disclosure, user-specific query (USQ) embeddings are generated because different users can refer to different meanings when using the same text query. For a query l from user j, the user-specific query embeddings can be computed according to Equation 7, as follows:

$$q_{j,l}^u = ReLU(W_q[u_j, q_l] + b_q), \tag{7}$$

where $W_q$ and $b_q$ are model parameters. A user-specific query embedding may be generated when an existing user enters a new query.

Given a query l from user j, the probability for retrieving cluster k can be computed according to equation 8, as follows:

$$p(C_k | u_j, q_l) = \text{softmax}\left(W_1\left[\frac{q_{j,l}^u}{\|q_{j,l}^u\|} * \frac{c_k}{\|c_k\|}\right] + b_1\right), \tag{8}$$

where * denotes an entry-wise product. Similarly, given a query l from user j, the probability for retrieving media i (e.g., an image) can be computed according to Equation 9, as follows:

$$p(I_i | u_j, q_l) = \text{softmax}\left(W_2\left[\frac{q_{j,l}^u}{\|q_{j,l}^u\|} * \frac{x_i}{\|x_i\|}\right] + b_2\right), \tag{9}$$

where $W_1$, $W_2$, $b_1$, and $b_2$ are model parameters. When an existing user (e.g., a user already represented by the augmented graph) enters a query into the user interface 150 and the media retrieval module 114 sends a media request 116 across the network 108 including a user ID of the user and the query. The media retrieval manager module 118 receives the media request 116, determines a user specific query embedding for a user associated with the user ID from user embeddings of the augmented graph and query embeddings of the entered query, selects one of the available media items, determines item embeddings $x_i$ of the selected item from the augmented graph, and inputs the user specific query embeddings and item embeddings $x_i$ into equation 9 to determine a confidence score (e.g., a probability) for the selected item, and repeats this for each of the media items until it computes a confidence score for all the media items. The top-k items having a confidence score above a certain item threshold can be presented in the graphical user interface 150. Equation 9 includes a softmax function, which takes as input a vector of K real numbers and normalizes the input vector into a probability distribution consisting of K probabilities proportional to the exponential of the input numbers. The peak value of the probability distribution may be used as the confidence score.

Combining the loss over retrieved items and clusters, a composite entropy-based loss function L is defined according to equation 10, as follows:

$$\mathcal{L} = -\sum_{\{i,j,l\}} y_{i,j,l} \log p(\mathcal{I}_i \mid u_j, q_l) - \lambda y_{i,j,l} \log p(\mathcal{C}^*_{Cl(i)} \mid u_j, q_l), \quad (10)$$

where $y_{i,j,l}=1$ if the user clicked on/purchased the item i under the query l, and $y_{i,j,l}=0$ otherwise. The hyper-parameter $\lambda$ controls the weight of the cluster level loss.

In addition to images that include embeddings, the above-described framework may be applied to computer software. For example, the user could enter a query in the graphical user interface for a certain type of computer game, where the available items are computer games. For example, embeddings of such items could include a game price, a discounted price, a game metascore, an overall sentiment, and various other textual tags that describe the game or the genre of the game. In a corresponding user-item graph, the graph edges represent the purchase relationship between users and computer games.

If no user is associated with the received user ID, the query has been entered by a new user. When a new user comes in with no click records, the system behaves with no personalization (e.g., uses a standard query-based retrieval). When the new user starts clicking media items (e.g., images), the system can gradually model the user preferences through the information propagation in the user-item graph. For example, if user $u_3$ of FIG. 3 is the new user, and the new user has made a few clicks in the inference/testing stage, such click information firstly propagates to the corresponding cluster $c_2$, and then further passes to the user via the graph convolutional network. The parameters of the graph convolutional network and the embeddings of clusters for inference are obtained in the training stage.

Figure 5:
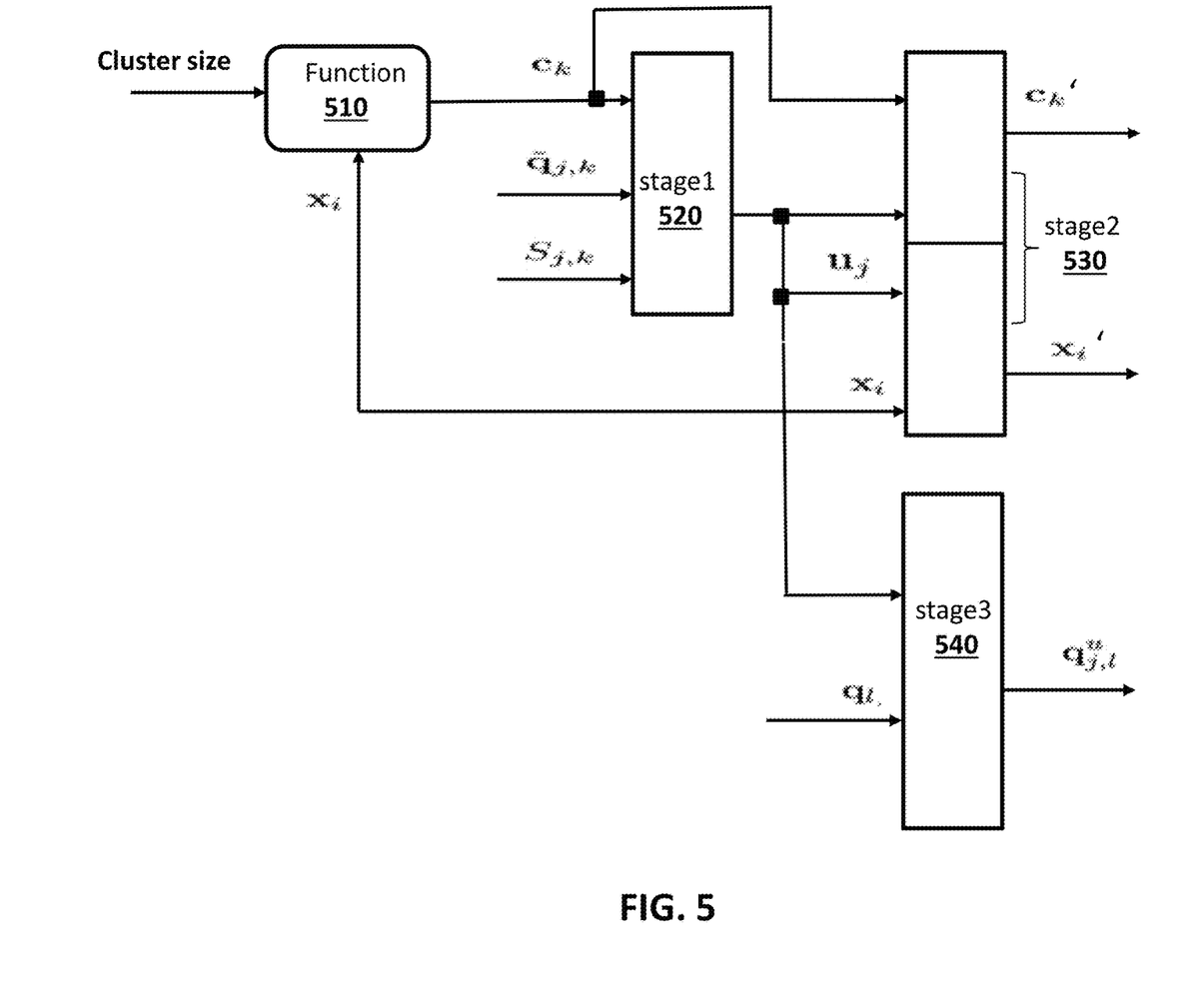
FIG. 5 is a graphical illustration of a neural network to implement an exemplary embodiment of the disclosure.

FIG. 5 illustrates a graphical illustration of a neural network to implement an exemplary embodiment of the disclosure. The graphical illustration includes a function 510 that operates on a cluster size (e.g., $|C_k|$) and the initial media item embeddings $x_i$ to generate the cluster embeddings $c_k$. For example, equation 1 may be used to implement function 510. The illustration further includes a first stage 520 of a neural network that operates on the cluster embeddings $c_k$, the aggregated query embeddings $\tilde{q}_{j,k}$, and the normalized click/purchase count $S_{j,k}$ to generate the user embeddings $u_j$. For example, the first stage 520 may be represented by Equation 3. The illustration further includes a second stage 530 of the neural network. The second stage 530 can be operated on the cluster embeddings $c_k$ and user embeddings $u_j$ generate updated cluster embeddings $c_k'$ or on the media item embeddings $x_i$ and the user embeddings $u_j$ to generate updated media item embeddings $x_i'$. For example, the second stage 530 may be represented by Equation 5 and Equation 6. The illustration further includes a third stage 540 of the neural network that operates on user embeddings $u_j$ and the query embeddings $q_l$ to generate query-specific user embeddings $q_{j,l}''$. For example, the third stage 530 may be represented by Equation 7.

Figure 6:
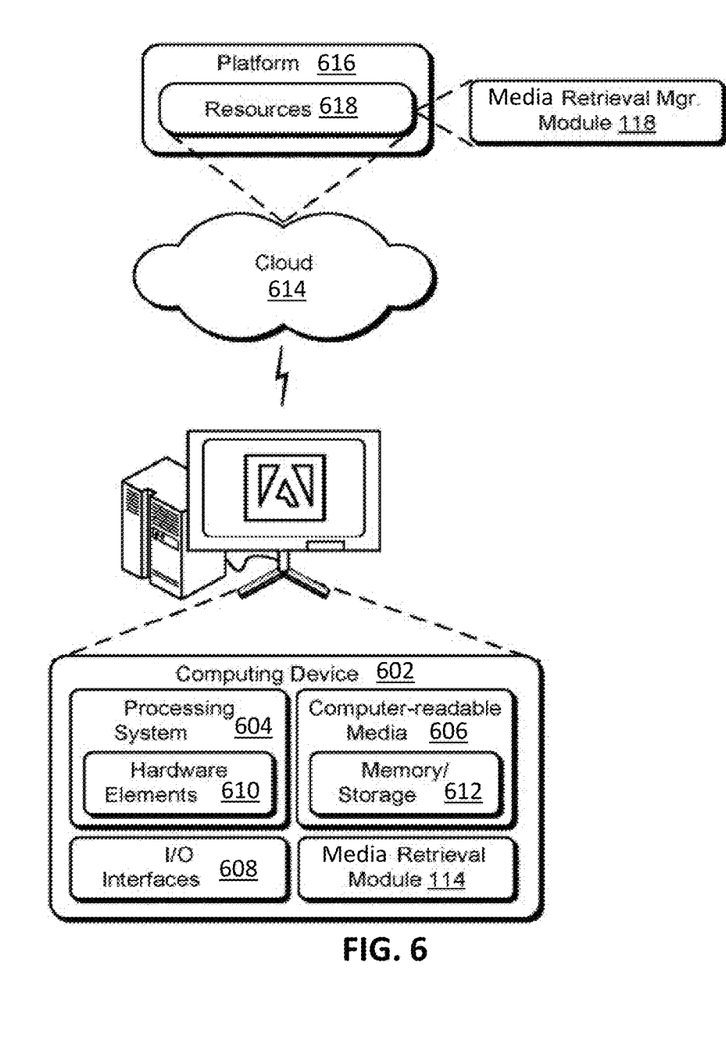
FIG. 6 illustrates an example system including various components of an example device that can be implemented as any type of computing device as described and/or utilized with reference to FIGS. 1-6 to implement embodiments of the techniques described herein.

FIG. 6 illustrates an example system generally that includes an example computing device 602 that is representative of one or more computing systems and/or devices that may implement the various techniques described herein. This is illustrated through inclusion of the media retrieval module 114 and the media retrieval manager module 118. The computing device 602 may be, for example, a server of a service provider, a device associated with a client (e.g., a client device), an on-chip system, and/or any other suitable computing device or computing system.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media".

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system of FIG. 6. For example, the functionality may be implemented in part on the computing device 602 as well as via the platform 616 that abstracts the functionality of the cloud 614.

Embodiments of the proposed method can significantly improve retrieval performances. The framework can be used to generate enhanced item embeddings with richer semantic information. At least one embodiment of the method can be applied to image-based queries. For example, instead of the user entering a textual query into the user interface 150, the user could enter an image that includes one or more item embeddings (tags). The framework is capable of finding nearest neighbor images of the entered image. For example, the nearest neighbors found by the framework have similar desired characteristics and more common tags with the query image. For example, the nearest images found by the framework could have similar components such as an emotion of a person.

The proposed framework provides a retrieval method based on CA-GCN and sparse graph augmentation. This method effectively extracts personalized features for each user, which helps in targeting the right products to each query. Not only does the framework improve retrieval performance on real-world datasets, but it also can generate item embeddings with enhanced semantics.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A computer-implemented method for retrieving at least one media item from a plurality of media items in response to a given query from a given user of a set of users, the method comprising:
generating a graph including first vertices each representing a corresponding user among the set of users, second vertices representing a subset of the plurality of media items returned from a plurality of queries for a media item, the first vertices connected to the second vertices via edges, each second vertex associated with one or more media textual keywords of the corresponding media item and each edge associated with one or more query textual keywords of a query among the plurality of queries;
performing a clustering on all of the media items to generate a plurality of clusters, wherein each cluster includes a distinct subset of the media items;
adjusting the graph so that each of the second edges becomes connected to a corresponding one of the clusters;
determining cluster textual keywords for each cluster from the media textual keywords associated with the media items within the corresponding cluster;
augmenting the textual cluster keywords for each cluster with the query textual keywords of the edges that are connected to the corresponding cluster;
inputting the augmented textual cluster keywords to a first layer of a graph convolutional network (GCN) to determine user embeddings of the users;
inputting the user embedding of the given user and the query textual keywords of the given query to a second layer of the GCN to determine a user-specific query embedding;
generating an item confidence score for each of the media items based on the media textual keywords and the user-specific query embedding; and
presenting the media items having the item confidence score exceeding an item threshold.

2. The computer-implemented method of claim 1, further comprising:
inputting the cluster textual keywords and the user embeddings to a third layer of the GCN to generate enhanced cluster embeddings;
generating a cluster confidence score for each of the clusters based on the enhanced cluster embeddings and the user-specific query embedding; and
presenting the media items of the cluster having the cluster confidence score exceeding a confidence threshold.

3. The computer-implemented method of claim 1, further comprising:
inputting the media textual keywords and the user embeddings to a third layer of the GCN to generate enhanced item embeddings;
generating a second item confidence score for each of the media items based on the enhanced item embeddings and the user-specific query embedding; and
presenting the media items having the second item confidence score exceeding the item threshold.

4. The computer-implemented method of claim 1, wherein an activation function of each layer of the GCN is a rectified linear unit (ReLU) function.

5. The computer-implemented method of claim 1, the generating of the item confidence score includes applying a softmax function to the user-specific query embedding and each of the media textual keywords.

6. The computer-implemented method of claim 1, wherein the media items are electronic images.

7. The computer-implemented method of claim 1, wherein each embedding is text.

8. The computer-implemented method of claim 1, wherein the performing of the clustering comprises performing a k-means clustering on the media items.

9. A system for retrieving at least one media item from a set plurality of media items in response to a given query from a given user of a set of users, the system comprising:
a client device comprising a graphical user interface configured to enable the given user to enter the given query and a computer program configured to output a request including a user identifier (ID) of the given user and the given query over a computer network; and
a server configured to generate a graph from the set of users, a subset of the plurality of media items returned from a plurality of queries for a media item, generate clusters from all of the media items each including a distinct subset of the media items, augment the graph to include the clusters, generate cluster textual keywords for each cluster from media textual keywords associated with the media items within the corresponding cluster, augment the cluster textual keywords for each cluster with query textual keywords of edges of the graph that pass through the corresponding cluster, input the augmented textual cluster keywords to a first layer of a graph convolutional neural network (GCN) to determine user embeddings of the users, input the user embedding associated with the user ID and the query textual keywords of the given query to a second layer of the GCN to generate a score for each of the media items, and output the media items to the client device having the score exceeding a threshold.

10. The system of claim 9, wherein the computer program presents the output media items on the graphical user interface.

11. The system of claim 9, wherein the generate of the clusters performs a k-means clustering on the media items.

12. The system of claim 9, where the graph is generated from data of a plurality of users indicating which one of the media items was previously selected by a corresponding one of the users and which one of a plurality of queries the one user entered to receive the one media item during a prior retrieval operation.

13. The system of claim 9, wherein an activation function of the GCN is a rectified linear unit (ReLU) function.

14. The system of claim 9, wherein the media items are electronic images.

15. The system of claim 9, where the graph includes first vertices each representing a corresponding user among the set of users and second vertices representing the subset of the media items, the first vertices connected to the second vertices via edges, each second vertex is associated with one or more media textual keywords of the media items and each edge is associated with query textual keywords of one of the queries.

16. The system of claim 15, wherein the input of the user embedding and the query textual keywords of the given query to generate the score determines a user-specific query embedding and generates the score for each of the media items based on the media textual keywords and the user-specific query embedding.

17. The system of claim 16, wherein each embedding is text.

18. A computer-implemented method for retrieving at least one media item from a plurality of media items in response to a given query from a given user of a set of users, the method comprising:

generating a graph including first vertices representing the set of users, second vertices representing a subset of the media items returned from a plurality of queries for a media item, the first vertices connected to the second vertices via edges, each second vertex associated with one or more media textual keywords of the corresponding media item and each edge associated with one or more query textual keywords of a query among the plurality of queries;

performing a clustering on all of the media items to generate a plurality of clusters, wherein each cluster includes a distinct subset of the media items;

generating cluster textual keywords for each cluster from the media textual keywords associated with the media items within the corresponding cluster;

augmenting the textual cluster keywords for each cluster with the query textual keywords of the edges that pass through the corresponding cluster;

inputting the augmented textual cluster keywords to a layer of a graph convolutional network (GCN) to determine user embeddings of the users;

generating an item confidence score for each of the media items based on the media textual keywords and the user embeddings; and presenting the media items having the item confidence score exceeding an item threshold.

19. The computer-implemented method of claim 18, wherein the media items are computer programs.

20. The computer-implemented method of claim 18, wherein the given query is received in a computer message including a user identifier (ID) of the given user.

* * * * *